J. HALL.
LUBRICATING DEVICE FOR BEARINGS.
APPLICATION FILED FEB. 27, 1915.
1,163,405.
Patented Dec. 7, 1915.
Fig. 1.
Fig. 2.
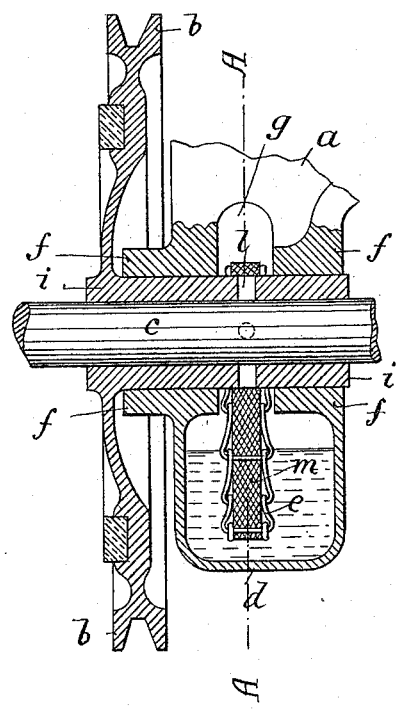
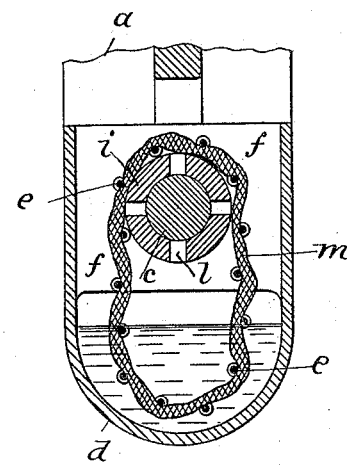
Witnesses.
Ferdinand B. Bosshardt.
Stanley Bramall
Inventor.
James Hall
per Ferdinand Bosshardt
Attorney.

UNITED STATES PATENT OFFICE.

JAMES HALL, OF GUIDE BRIDGE, NEAR MANCHESTER, ENGLAND, ASSIGNOR TO JONES' SEWING MACHINE COMPANY LIMITED, OF GUIDE BRIDGE, ENGLAND.

LUBRICATING DEVICE FOR BEARINGS.

1,163,405.   Specification of Letters Patent.   Patented Dec. 7, 1915.

Application filed February 27, 1915. Serial No. 11,111.

*To all whom it may concern:*

Be it known that I, JAMES HALL, a subject of the King of Great Britain, residing at Guide Bridge, near Manchester, in the county of Lancaster, England, have invented certain new and useful Improvements in Lubricating Devices for Bearings; and I do hereby declare the following to be a full, clear, and exact description of the invention, such as will enable others skilled in the art to which it appertains to make and use the same.

My invention relates to improvements in lubricating devices for the friction clutch drives of that type of sewing machine power benches in which there is employed a driven clutch pulley journaled in a bearing and a shaft journaled in the hub or boss of the said driven clutch pulley. In this type of friction clutch drive it is necessary to lubricate both the driven clutch pulley journaled in the bearing and the shaft journaled in the hub or boss of the said driven clutch pulley.

My invention has for its object to provide a lubricating device which will effectually lubricate the said shaft and the driven clutch pulley both when the driven clutch pulley is stopped and when it revolves.

To this end my invention consists in the first place in forming the boss of the said bearing in two parts and with an oil well or reservoir depending therefrom and the hub or boss of the driven clutch pulley with holes while upon the said hub or boss I employ a lubricating chain which revolves therewith and dipping into the oil in the said well or reservoir, carries the oil around the said hub or boss to flow through the said holes upon the shaft journaled in the said hub or boss.

My invention consists in the second place in the employment of a soft piece of cotton fabric, wick or the like absorbent material intertwined in the said lubricating chain and adapted to act as a siphon and convey oil from the said well or reservoir to the periphery of the hub or boss of the said driven clutch pulley while the latter is stopped.

I attain these objects by the mechanism illustrated in the accompanying drawing, in which—

Figure 1 is a longitudinal section, and Fig. 2 a cross section on line A—A of Fig. 1, of a friction clutch drive provided with my improved lubricating device.

Similar letters refer to similar parts throughout the several views.

Referring to the annexed drawings, $a$ is the said friction clutch bearing, $b$ the driven clutch pulley journaled in the said bearing, $c$ the shaft journaled in the hub or boss of the driven clutch pulley, $d$ the oil well or reservoir, and $e$ the lubricating chain. The boss $f$ of the bearing $a$ I form in two parts so as to provide a gap $g$ for the lubricating chain $e$ to rest upon and revolve with the hub or boss $i$ of the driven clutch pulley. The hub or boss $i$ of the driven clutch pulley $b$ extends through both of the parts of the boss $f$ and the part thereof exposed by the gap $g$ I form with holes $l$ through which the oil conveyed by the said chain around the hub or boss $i$ flows onto the shaft $c$. The oil well or reservoir $d$ depends from the boss $f$ of the bearing $a$ and extends up each side thereof, see more particularly Fig. 2.

To provide an efficient lubrication to serve both when the driven clutch pulley is stopped and when it revolves, I intertwine between the loops or links of the lubricating chain $e$ a soft piece of cotton fabric, wick $m$ or the like absorbent material which siphons the oil from the well or reservoir $d$ to the periphery of the hub or boss $i$ of the driven clutch pulley $b$ while the latter and consequently the said chains $e$ stop. By these means both the shaft $c$ and the driven clutch pulley $b$ are constantly lubricated.

I claim:

1. In a friction clutch drive of the type hereinbefore referred to, a bearing having a lubricating well, a driven clutch pulley journaled in the said bearing and with lubricant holes in its boss, a shaft journaled in the said driven clutch pulley, and a lubricating chain carried by the said boss, to revolve with the said driven clutch pulley and in the said well to lubricate the said driven clutch pulley while rotating and also to convey lubricant to the said shaft by the aid of the said holes.

2. In a friction clutch drive of the type hereinbefore referred to, a bearing having a lubricating well, a driven clutch pulley journaled in the said bearing and with lubricant holes in its boss, a shaft journaled in the said driven clutch pulley, a lubricating chain carried by the said boss, to revolve with the said driven clutch pulley and in the said well to lubricate the said driven clutch pulley while rotating and also to convey lubricant to the said shaft by the aid of the said holes and absorbent material intertwined between the links of the said chain to act as siphon to lubricate the said driving shaft while the said driven friction clutch pulley and chain remain at rest.

Signed at Manchester, England, this 16th day of February, 1915.

JAMES HALL.

Witnesses:
FERDINAND B. BOSSHARDT,
STANLEY E. BRAMALL.